A. M. HALL.
DIRIGIBLE HEADLIGHT FOR AUTOMOBILES.
APPLICATION FILED JAN. 31, 1917.
1,253,172.
Patented Jan. 8, 1918.
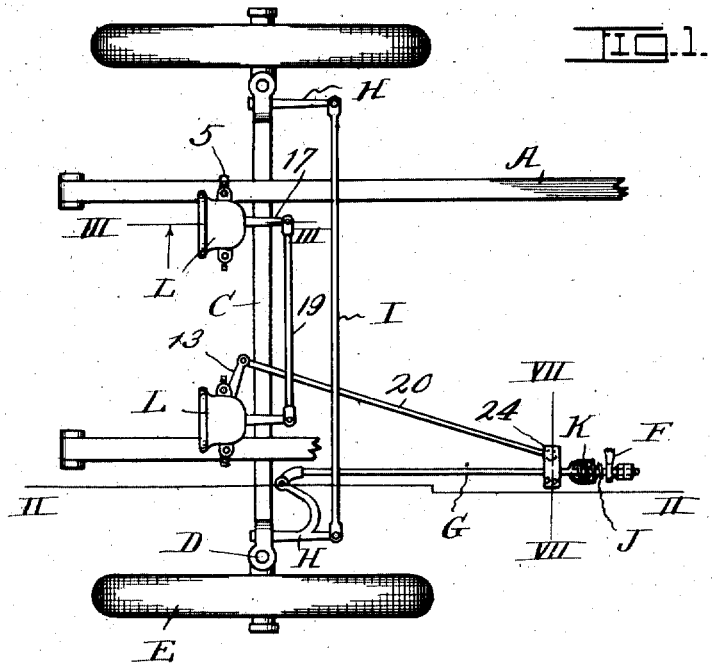
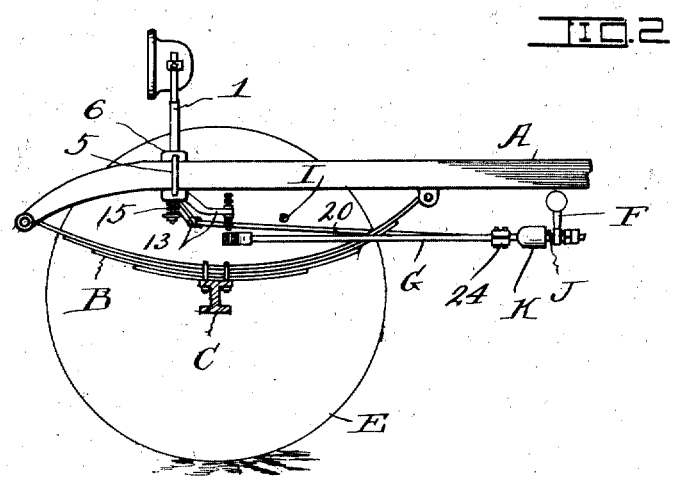
WITNESS:
INVENTOR.
Adelbert M. Hall,
BY
ATTORNEYS.

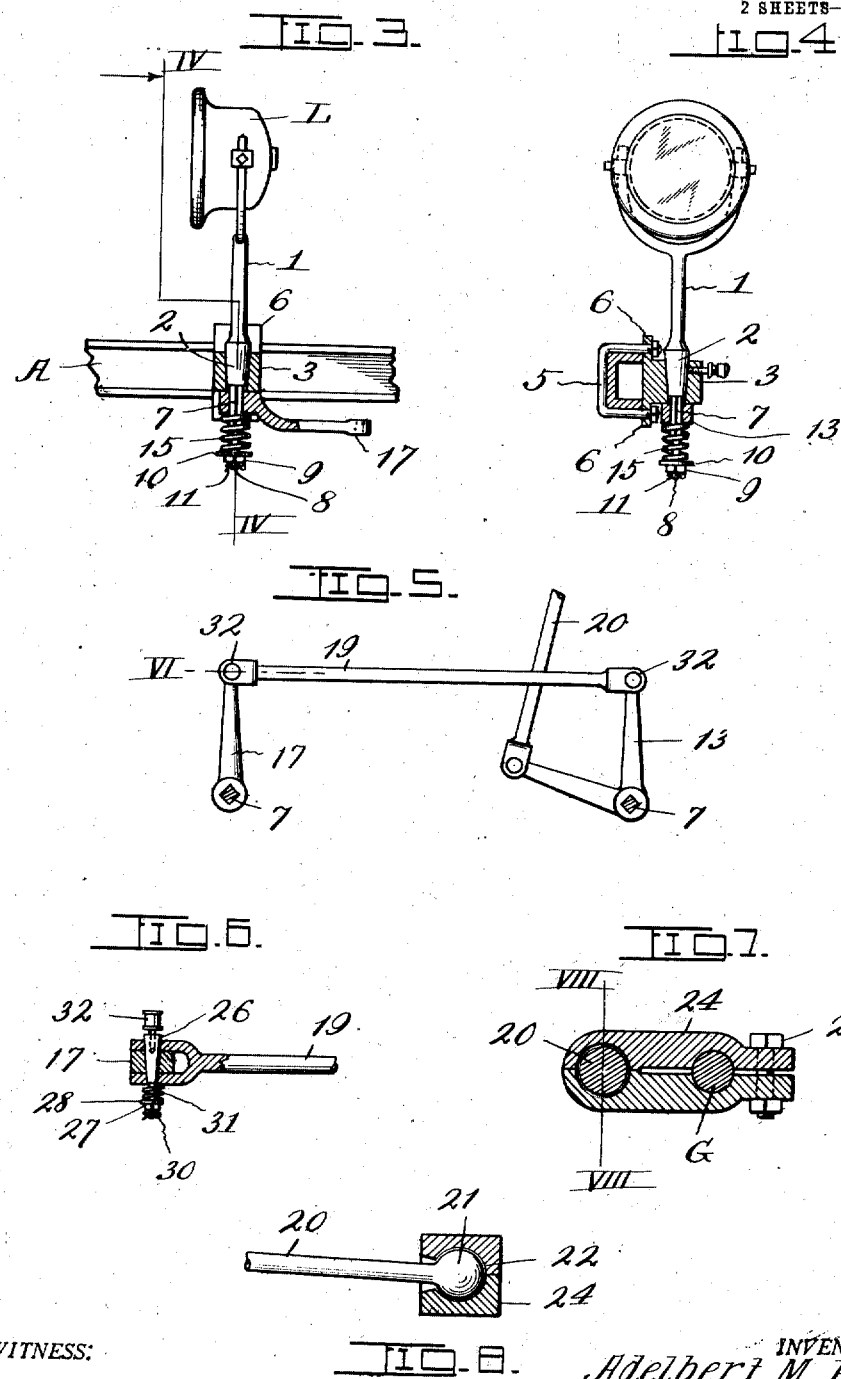

UNITED STATES PATENT OFFICE.

ADELBERT M. HALL, OF BALDWIN, KANSAS.

DIRIGIBLE HEADLIGHT FOR AUTOMOBILES.

1,253,172.  Specification of Letters Patent.  Patented Jan. 8, 1918.

Application filed January 31, 1917. Serial No. 145,612.

*To all whom it may concern:*

Be it known that I, ADELBERT M. HALL, a citizen of the United States, residing at Baldwin, in the county of Douglas and State of Kansas, have invented certain new and useful Improvements in Dirigible Headlights for Automobiles, of which the following is a specification.

My invention relates to dirigible headlights for automobiles, and one object is to provide an arrangement for transmitting motion from the steering mechanism to the headlights whereby the latter may be simultaneously turned with the turning of the front wheels, so as to throw the light rays in the prevailing direction of travel of the automobile.

A further object is to provide a mechanism for the above purpose which is of simple and inexpensive construction and may be readily applied to automobiles now in common use without necessitating any material alterations in their construction.

In order that the invention may be fully understood, reference will now be made to the accompanying drawings, in which:

Figure 1 is a broken plan view of the front portion of an automobile provided with my invention.

Fig. 2 is an irregular section taken on line II—II of Fig. 1.

Fig. 3 is an enlarged section taken on line III—III of Fig. 1.

Fig. 4 is an irregular section taken on line IV of Fig. 3.

Fig. 5 is a plan view, partly in section of some of the important parts employed in carrying out the invention.

Fig. 6 is an enlarged section on line VI—VI of Fig. 5.

Fig. 7 is a section on line VII—VII of Fig. 1.

Fig. 8 is a section on line VIII—VIII of Fig. 7.

The same reference characters indicate similar parts throughout the drawings.

On said drawings the longitudinal frame members of the automobile are indicated at A, the front ends thereof being supported by springs B carried by a front axle C, provided with the customary knuckle joints D to which the stub shafts mounting the front wheels E are operably connected. The usual steering mechanism for guiding the front wheels E is employed and is indicated by an arm F, the steering rod G, the steering arms H, and the drag-bar I. A coil spring J is interposed between the arm F and a tubular member K on the steering rod G, to allow slight lateral vibration of the wheels E when running over a road without affecting the arm F.

L designates the headlights, each being mounted upon a bracket 1 having a tapered journal 2 mounted in a corresponding bearing 3, suitably secured to the adjacent side bar A of the automobile. In order to avoid weakening said side bar I prefer to secure the bearing 3 thereto by a U-bolt 5 passing through eyes 6 at the upper and lower ends of the bearing 3. Below the tapered journal 2, the bracket 1 has a rectangular stem 7, which terminates in a cylindrical portion 8, threaded to receive a nut 9. A washer 10 rests upon the nut 9, which latter is prevented from coming off the threaded portion 8 by a cotter 11.

The rectangular stem 7 extends through a corresponding opening in a crank 13, held upwardly against the underside of the bearing 3 by a coil spring 15, interposed between said crank 13 and the washer 10. In this connection it will be noted that the crank 13 opposes the lower nut on the U-bolt 5 to prevent accidental dislodgment thereof and since the crank is yieldably retained against the underface of the bearing 3 by spring 15 said crank may be depressed from opposing the nut to permit the latter being removed. The upper nut on the U-bolt is opposed by the tapered journal 2 and since this also is yieldably seated, it, too, may be lifted to bring the smaller part of the taper opposite the nut. Therefore, while both nuts are locked against accidental displacement still the parts which so lock the nuts are yieldably mounted and may be rendered inoperative, relative to their secondary function, without the use of any tools whatsoever. With the foregoing construction it is obvious that as the tapered journal 2 and its bearing 3 wear, such wear will be automatically taken up by the spring 15 and consequently said journal will not become loose and rattle in the bearing 3. When necessary the tension of the spring 15 can be controlled by proper adjustment of the nut 9.

The mechanism for supporting the headlight at the opposite side of the automobile is similar to that above described, except a straight crank 17 is employed instead of the bell-crank 13. The two cranks 13 and 17 are pivotally secured to a link 19, whereby the crank 17 is caused to turn with the bell-crank 13. The bell-crank 13 is controlled by a connecting rod 20, pivotally secured at its forward end to said bell-crank and provided at its rear end with a ball 21 operably mounted in a socket 22 in one end of a clip 24, the opposite end of which is clamped upon the rear portion of the steering rod G by bolts 25.

The pivots 26 connecting the link 19 to the cranks 13 and 17 are tapered and the lower threaded end of each is provided with a nut 27 and a washer 28, said nut being secured from accidental displacement by a cotter 30 extending through the lower terminal of the pivot 26. A coil spring 31 is interposed between the washer 28 and the underside of the link 19 to automatically take up wear of said pin where it extends through the forked end of said link 19 and the crank. Each pin 26 is supplied with lubricant from an oil cup 32, communicating with a duct extending part way through said pin.

From the foregoing description it is apparent that when the steering mechanism is operated to turn the front wheels E that the mechanism constituting my invention will simultaneously turn the headlights L with said front wheels and enable the driver to readily follow the curves in a road over which he may be traveling at night. It is also obvious, that owing to the tapered journals 2 of the headlight brackets 1 and the tapered pins 26, with means for taking up wear thereof, these parts will be prevented from getting loose and rattling. It is also apparent that all binding of the rod 20 due to the up and down expansion and contraction of the springs B, is overcome by the ball-and-socket connection between the rear end of said rod 20 and the clip 23, which permits the forward ends of the rods 20 and G to move independently of each other.

While I have shown and described the preferred form of my invention I reserve the right to make such changes in the construction, combination, and arrangement of parts as properly fall within the spirit and scope of the claim.

Having thus described my invention, what I claim and desire to secure by Letters Patent, is:

In combination with a side bar of the chassis of an automobile, a dirigible headlight mechanism comprising a bearing member seating against the side of the bar and formed with upper and lower extensions and a vertical bearing, means detachably engaged with the upper and lower extensions of the bearing member for securing the same to the side bar, a lamp bracket formed with a depending journal seating in the bearing of said bearing member opposite the upper extension-engaging means, a crank arm slidably passed over the depending end of the journal and seated against the under face of the bearing member opposite the lower extension-engaging means, a spring yieldably urging the bracket journal to its seat and the crank arm against the underface of the bearing member but permitting movement of said journal and crank arm from opposite the respective extension-engaging means, and means connected to the crank arm for turning the bracket.

In testimony whereof I affix my signature, in the presence of two witnesses.

ADELBERT M. HALL.

Witnesses:
 NELLIE HALL,
 JAMES W. PRESTON.